United States Patent Office 3,072,635
Patented Jan. 8, 1963

3,072,635
READILY DISSOLVING CELLULOSE DERIVATIVES AND PROCESS THEREFOR
John Hanus Menkart, Washington, D.C., and Ronald Stuart Allan, Montreal, Quebec, Canada, assignors, by mesne assignments, to Chemical Development of Canada, Limited, Montreal, Quebec, Canada, a company of Canada
No Drawing. Filed Nov. 4, 1959, Ser. No. 850,761
11 Claims. (Cl. 260—232)

The present invention relates generally to the manufacture of cellulose derivatives. It is concerned, more particularly, with a method for treating a cellulose derivative, especially a water-soluble cellulose ether, in order to improve the solubility characteristics of the cellulose derivative.

Water-soluble ethers of cellulose are produced in a well-known manner by reacting alkali-treated cellulose with an appropriate etherifying agent, i.e., an alkylating agent such as methyl chloride or a hydroxyalkylating agent like ethylene oxide, or a carboxyalkylating agent like monochloracetic acid, under conditions which result in the production of a soluble product.

However, the cellulose ethers thereby produced, especially the alkyl, hydroxyalkyl or carboxyalkyl ethers of cellulose, while being water-soluble, are not readily so, and their dissolution is usually a difficult and time-consuming process. The difficulties are due apparently to a gel layer forming on the surface of the particles, or of clusters of particles, which prevents the uniform dispersion and subsequent dissolution of the material. Since many of the applications which these substances have found in industry are based on their property of water solubility the difficulties in dispersing and dissolving such substances are a serious impediment to their more widespread use.

It is an object of the present invention, therefore, to provide a method for producing cellulose derivatives, especially cellulose ethers and cellulose esters, which are water-soluble and have the further property of being rapidly and uniformly dispersed in an aqueous medium.

A further object is to provide a method for treating cellulose ethers so as to produce cellulose ethers which dissolve readily in water.

These objects are achieved, in accordance with the present invention, by treating a cellulose derivative of the type described with an aldehyde treating agent, preferably glyoxal, although such aldehydes as formaldehyde and succinaldehyde can also be used. The extent and manner of treatment with the aldehyde treating agent is controlled so as not to affect the fibrous or granular consistency of the cellulose derivative nor substantially to impair its solubility in water.

Thus, the reaction of a water-soluble cellulose ether with a dicarbonyl compound may well lead to the formation of compounds which are insoluble in water. For example, water-resistant coatings and films have been produced from water-soluble cellulose ethers by treating such ethers in aqueous solution with alpha-dialdehydes and drying the composition thus formed. We have found, however, that when relatively small proportions of the aldehyde treating agent are used for the reaction, the product remains water-soluble. More particularly, when a relatively small proportion of the aldehyde treating agent is made to react with a cellulose ether, the latter being in the particulate form, a product is obtained which retains substantially the properties and consistency of the original cellulose ether, but which, on contact with water, disperses instantly without the formation of gelatinous agglomerates of particles and goes readily into solution. This change in the dispersive properties of the cellulose derivative is believed to be due to a condensation reaction with the aldehyde treating agent, said condensation reaction taking place in the process of the present invention only to a limited extent, notably on the exposed surface of the cellulose derivative particles, and having the effect of reducing the affinity for water of the cellulose derivative without materially affecting its solubility, so that on contact with water dispersion of the cellulose ether will take place before swelling sets in.

The cellulose derivatives to be treated in accordance with the invention, in general, are cellulose derivatives which are classed as water-soluble and/or alkali-soluble. Thus, it is well known that cellulose ethers and cellulose esters, such as cellulose sulfate, have varying degrees of solubility in aqueous alkali, hot water and cold water depending on such characteristics as degree of substitution and average degree of polymerization or average molecular weight of the cellulose derivative under consideration. A great number of cellulose ethers having such properties are known and produced commercially. Ionic cellulose ethers are obtained by introducing into the cellulose molecule groups such as carboxymethyl, carboxyethyl or sulfoethyl groups. Nonionic cellulose ethers are obtained by introducing into the cellulose molecule groups such as methyl, ethyl, hydroxyethyl or cyanoethyl groups. Other cellulose ethers are prepared commercially which contain two or more substituents, such as methyl hydroxyethyl cellulose, ethyl hydroxyethyl cellulose, methyl ethyl cellulose, methyl carboxymethyl cellulose, hydroxyethyl carboxymethyl cellulose.

Certain of the cellulose ethers are soluble only in aqueous alkali while other cellulose ethers are soluble in water as well as aqueous alkali. As a general rule, a cellulose ether or a cellulose ester having only a low degree of substitution is soluble only in aqueous alkali, while a cellulose ether or cellulose ester having a higher degree of substitution is soluble in water as well as in aqueous alkali. As noted above, the relative solubility of the cellulose derivative is influenced not only by the degree of substitution, but also somewhat by the average degree of polymerization or average molecular weight in that the solubility increases somewhat as the degree of polymerization decreases. Thus, a carboxymethylcellulose having a degree of substitution, by which we mean the number of substituent groups per anhydroglucose unit of the cellulose molecule, of about 0.3 is usually soluble in aqueous alkali only, while a carboxymethylcellulose having a degree of substitution of 0.5 or higher is soluble in water as well as aqueous alkali. Ethyl cellulose having a degree of substitution of about 0.6 to 0.8 dissolves only in aqueous alkali, but when the degree of substitution is about 1.2 to 1.3, ethyl cellulose dissolves moderately well in water. Analogous relations apply to methyl cellulose. With cellulose ethers containing methyl and ethyl groups, however, the solubility in water decreases when the degree of substitution is increased further above a certain optimum value. This is due to the fact that methyl and ethyl groups have a hydrophobic character in themselves.

Additionally, certain water-soluble cellulose ethers are soluble only in water of about room temperature or below while being insoluble in hot water. This is true of methyl and ethyl cellulose and of certain mixed cellulose ethers containing one or both of these groups. Ethyl hydroxyethyl cellulose containing 13% of oxyethylene groups and 25% of ethoxyl groups and methyl hydroxyethyl cellulose containing 4% of oxyethylene groups and 21% of methoxyl groups are examples of such cellulose ethers that are insoluble in hot water while being soluble in cold water.

The cellulose derivative that is treated in accordance with the process of the invention must be in the particulate form, and while the particle size is not critical, it is preferred to employ particles of the usual range of sizes of the commercial products, i.e., between 20 and 350 mesh, U.S. sieve standard. Also, it has been found that a certain amount of moisture is desirable for good contact between the cellulose ether and the aldehyde treating agent and, therefore, it is preferred when applying the aldehyde treating agent by a spray method to employ a cellulose derivative of the type described having an average moisture content of not less than about 10 weight percent. The cellulose derivative to be treated can be in any solid form, such as fibers, granules, or powder.

The process of the invention can be carried out in a variety of ways. Thus, the aldehyde treating agent, such as glyoxal, can be dissolved in an organic solvent with which it is miscible and which under the conditions of the treatment of the cellulose derivative is a non-solvent for the derivative, itself. The organic solvent, however, can be such as to cause swelling of the solid derivative. It is preferred that the organic solvent be volatilizable so that after treatment the cellulose derivative can be dried without difficulty and without requiring excessively high drying temperatures. Alcohols or alcohol-water mixtures are suitable organic solvents. Thus, organic solvents which can be used include acetone, methyl ethyl ketone, methanol, ethanol and propanol. In some cases, water is the most inexpensive and most convenient solvent. Thus, hot water can be used as the solvent for the aldehyde treating agent when treating those cellulose ethers which are insoluble in hot water, such as methyl cellulose. Water can be employed also as the solvent when treating cellulose derivatives which are soluble in aqueous alkali only. When employing a solvent for the aldehyde treating agent, the cellulose derivative is suspended in the solvent with agitation for a length of time which can be varied but need not exceed about 30 minutes. The liquid is then separated and the solid, containing about 20 to 80 weight percent (on dry basis) of adsorbed solution, is oven dried at about 100° C. to eliminate the solvent and to enable the reaction between the cellulose ether and the aldehyde treating agent to take place. The products resulting from such treatment can be dispersed in cold water and completely dissolved within 15 to 20 minutes, while an untreated cellulose ether of the same type tends to form lumps in water and remains still incompletely dissolved after a period of several hours under the same conditions.

Another method of carrying out the invention which has been found particularly convenient for treatment of large quantities of carboxymethylcellulose, involves spraying the aldehyde treating agent, e.g. a 30% technical solution of glyoxal, onto a mass of particles of moist carboxymethylcellulose which is being subjected to a mixing action. The carboxymethylcellulose thus treated is dried subsequently at a temperature and under conditions such that no decomposition or discoloration occurs. The aldehyde treating agent is in droplet form when this method is used for carrying out the process of the invention.

Still another method for carrying out the invention involves subjecting the cellulose derivative to the vapors of the aldehyde treating agent. The vapor phase treatment can be carried out by introducing the aldehyde treating agent in vaporized form into a rotating, heated drum which is partly filled with the cellulose derivative to be treated. Alternatively, the cellulose derivative can be spread out on a suitable support, such as a wire screen, and there subjected to the action of the aldehyde treating agent in vapor form for a time sufficient to achieve the desired modification of the properties of the cellulose derivative and subsequently dried under the conditions described above.

There is an advantage in carrying out the process of the invention as part of a conventional stage in the manufacture of the cellulose derivative. For example, the production of sodium carboxymethylcellulose can include a refining operation and it is advantageous to carry out the process of the invention as part of the refining stage. Also, sodium carboxymethylcellulose can be subjected to the action of glyoxal vapor during the drying operation for the cellulose derivative. The aldehyde treating agent can also be introduced in the form of an alcoholic solution, or otherwise, during the etherification step of treating alkali cellulose with monochloracetic acid, or during the subsequent maturing or aging step. An important requirement, however, is that high alkalinity tends to polymerize an aldehyde treating agent such as glyoxal and such polymerization would prevent the reaction between glyoxal and a cellulose derivative, such as carboxymethylcellulose, from taking place. To avoid the hindrance of polymerization, the reaction with glyoxal should be carried out under substantially neutral conditions, i.e., a pH not greater than 8.

It is believed that the reaction between the cellulose derivative and the aldehyde treating agent takes place primarily during the drying period. It is important to control carefully the drying conditions, the temperature and time of drying, since sodium carboxymethylcellulose treated with glyoxal and subjected to an oven temperature above 90° C. for a considerable length of time results in a product which has apparently undergone a certain degree of decomposition and has poor dispersion characteristics. On the other hand, where such a glyoxal-treated sodium carboxymethylcellulose was dried at below 70° C., no such occurrence has been noted. The decomposition of the product due to heat is accompanied by an appearance of color on the normally white sodium carboxymethylcellulose and we have found that, generally speaking, a satisfactory product is obtained by drying at a temperature and/or for a length of time less than those at which a colored product is produced.

The quantity of the aldehyde treating agent that is necessary to achieve the desired effect varies according to the nature of the specific aldehyde treating agent used, the type of cellulose derivative and also the conditions under which the treatment is carried out. For example, we have found that, other conditions being equal, a low molecular weight sodium carboxymethylcellulose, of the type yielding low-viscosity solutions in water, requires treatment with a solution of glyoxal which is 2 to 5 times more concentrated than would be required when treating an otherwise similar high molecular weight sodium carboxymethylcellulose, of the type yielding high-viscosity solutions in water, to achieve the same degree of modification. Similarly, when an efficient method, such as spraying, is used for contacting the cellulose derivative with the aldehyde treating agent, the quantity of the aldehyde treating agent required will be considerably less than in other relatively less efficient methods. For the treatment to be effective, generally, sodium carboxymethylcellulose should be effectively combined or reacted with a quantity of glyoxal ranging from 0.001 to 0.2 mols of glyoxal per base-mol of the sodium carboxymethylcellulose, sodium carboxymethylcellulose in this context meaning 100% active ingredient. Assuming that sodium carboxymethylcellulose has an average degree of substitution of 0.6, the forestated range of quantity of glyoxal to be reacted corresponds to 0.027 to 5.5 weight percent of glyoxal based on the weight of sodium carboxymethylcellulose. Since the process of the invention is effective when only very small amounts of the aldehyde treating agent are used the broad range of amount of aldehyde treating agent can be expressed as about 0.005 to about 5 weight percent based on the weight of the cellulose derivative. These broad ranges of amounts of the aldehyde treating agent are based on the assumption that favorable reaction conditions, including elevated temperatures and in the case of formaldehyde high acidity, are employed. Under some circumstances it may not be possible or desirable to employ the optimum reaction conditions and it will be necessary to use more of the aldehyde treating agent to obtain the desired result or to employ a longer period of treatment. The amount of the aldehyde treating agent, however, should not be so great that under the reaction conditions cross-linkages are formed in the cellulose derivative being treated to such an extent that the solubility of the cellulose derivative is materially impaired. Generally, the amount of the aldehyde treating agent added will be below 5 weight percent based on the weight of the cellulose derivative treated, and often below 1 or 2 weight percent. The amount of the aldehyde treating agent to be used in a specific case to give optimum results can be ascertained easily by simple preliminary trials. A desirable range when using glyoxal is about 0.02 to 0.5 weight percent based on the weight of the cellulose derivative treated.

It has already been noted that the treatment process of the invention involves elevated temperatures and a period of time. The time of treatment is not critical and a treatment time of a minute or even less is adequate to produce the desired result when higher temperatures and greater amounts of the aldehyde treating agent are employed.

The treatment process of the invention employing formaldehyde as the aldehyde treating agent is influenced favorably by a high acidity and, therefore, it is desirable to add an acid, such as hydrochloric or sulfuric acid. In some cases, it may be undesirable to increase the acidity in this way, in which case it is better to use a larger amount of formaldehyde or continue the treatment for a longer period of time. Commercially available glyoxal in the form of a 30% or 50% solution in water usually has a sufficiently low pH, due to the presence of organic acids, so that special addition of acid is not necessary.

The invention will be understood more clearly by reference to the following examples which are provided in order to illustrate the invention.

*Example 1*

To 100 cc. of an 80% (by volume) denatured alcohol solution containing 0.60 cc. of a 30% technical solution of glyoxal, were added at room temperature 10 grams of a fibrous type of sodium carboxymethylcellulose known by the trademark "Carboxel" grade T253 (sodium carboxymethylcellulose content 82%, viscosity 100–150 cps. at 1% concentration). The suspension was mechanically agitated for 5 minutes, the solid was recovered by filtration and dried for half an hour at 105° C. The dried product was pulverized to reduce the lumps, formed in drying, to the original fibrous form. When added to cold water with gentle agitation, the product dispersed rapidly and formed a clear solution within a few minutes. Untreated "Carboxel" T253 similarly treated, the glyoxal being omitted, formed lumps under the same conditions, requiring vigorous agitation over a prolonged period for complete dispersion. The T253 grade of sodium carboxymethylcellulose has a degree of etherification of 0.43 and, based on the weight of sodium carboxymethylcellulose, there was 2.75 weight percent of glyoxal used in the treatment.

A similar improvement in the dissolution behavior was observed when hot water was used as solvent.

*Example 2*

The treatment described in Example 1 was repeated, using 10 grams of sodium carboxymethylcellulose of the same grade as in Example 1 and the following reagents, in the concentrations and conditions stated.

| | Grade | Reagent, Sol./CMC (cc./gm.) | Conc. of Reagent (Vol. Percent) | Medium, Vol. Percent Methyl Alc. in H₂O | Conditions |
|---|---|---|---|---|---|
| Succinaldehyde | 27.6% | 1.50 | 15.0 | 80% | In cold reflux. |
| Hydroxyadipaldehyde | 25.0% | 0.80 | 8.0 | 80% | Do. |
| Pyruvic aldehyde | 41.6% | 1.60 | 16.0 | 80% | Do. |
| Dimethyl glyoxal | C.P. | 0.15 | 1.50 | 80% | Do. |
| Acetyl acetone | C.P. | 0.55 | 5.52 | 80% | Do. |
| Chloracetaldehyde | 40–45% | 0.11 | 1.08 | Me Alc. | Do. |
| Ethylene dichloride | C.P. | 0.40 | 4.0 | 90% | Do. |
| Epichlorohydrin | C.P. | 0.15 | 1.50 | Me Alc. | Do. |
| Butadiene dioxide | B.P. 87–147° (100) | 0.076 | 0.76 | 80% | Do. |
| Glycerol dichlorhydrin | B.P. 66–69° (10) | 0.014 | 0.14 | Me Alc. | Do. |

The improvement in the dissolution behavior was approximately the same in each case.

*Example 3*

The treatment was carried out in the manner described in Example 1, except that the sodium carboxymethylcellulose used was a granular super-high viscosity type, known by the trademark "Carboxel" grade X375 (sodium carboxymethylcellulose content 90%, viscosity 2000–4000 cps. at 1% concentration), and the amount of 30% glyoxal solution was 0.3 cc. This material on dissolution behaved in the same manner as the material prepared according to Example 1. There was 1.25 weight percent of glyoxal, based on the weight of sodium carboxymethylcellulose, used in this treatment according to the invention.

The same treatment was carried out using a sodium carboxymethylcellulose of a granular low-viscosity type, known by the trademark "Carboxel" L245 (sodium carboxymethylcellulose content 82%, viscosity 80–150 cps. at 4% concentration), and the amount of 30% glyoxal solution added was 2.1 cc. This material on dissolution behaved in the same manner as the material prepared according to Example 1. There was 9.6 weight precent of glyoxal, based on the weight of sodium carboxymethylcellulose, used in this treatment according to the invention.

*Example 4*

One gram of sodium carboxymethylcellulose of the type known as "Carboxel" X375 was spread on a wire screen and suspended in the vapor issuing from 20 cc. of boiling 30% technical glyoxal solution for 20 minutes. After drying at 105° C. for half an hour, then pulverizing, the product dispersed much more readily in cold water than untreated sodium carboxymethylcellulose of the same type.

One gram of the sodium carboxymethylcellulose of the type known as "Carboxel" T253 was spread on a wire screen and suspended in the vapor of boiling 1,4-dichlorobutane (C.P.) for 25 minutes. After drying at 105° C. for half an hour, then pulverizing, the product dispersed much more readily in cold water than untreated sodium carboxymethylcellulose of the same type.

*Example 5*

A batch of 6600 pounds of sodium carboxymethylcellulose of the type known by the trademark "Carbose" (sodium carboxymethylcellulose content 65%) was made up of 50 parts of a wet product containing 38% water and of 50 parts of a dry product containing 5% water, so that the resulting mixture had an average moisture content of 21.5%. The mass of sodium carboxymethylcellulose was subjected to a rapid tumbling motion on a ribbon blender and while it was being thus agitated, about 219 pounds of a 25% solution of phosphoric acid were sprayed onto the mass of the cellulose ether until it was substantially neutral to phenol-phthalein, and then a quantity of 179 pounds of technical 30% glyoxal solution was sprayed onto the mass and the agitation continued for 15 to 20 minutes. The batch was flash dried at about 200° F. at the rate of about 320 pounds per hour. The amount of glyoxal used in this example was 1.5 weight percent based on the weight of sodium carboxymethylcellulose.

The resulting product showed very good dispersion characteristics in water.

*Example 6*

To 100 cc. of denatured ethanol, at room temperature, containing 0.6 cc. of a 30% technical solution of glyoxal, were added 10 parts of a water-soluble type of methyl cellulose, sold under the trademark "Methocel," technical grade, 1500 cps. viscosity. The suspension was agitated for 5 minutes, the solid was recovered by filtration and dried for half an hour at 105° C. The product was pulverized and screened. When added to cold water with gentle agitation. it dispersed rapidly and, on standing, formed a clear solution. Untreated methyl cellulose of the same type required dispersing in hot water and cooling to produce a similar solution.

The amount of glyoxal used was 2.75 weight percent based on the weight of methyl cellulose.

*Example 7*

To 100 cc. of methanol, at room temperature, containing 1.1 cc. of a 30% technical solution of glyoxal were added 10 parts of a water-soluble type of hydroxyethylcellulose, sold under the trade-name "Cellosize." The suspension was agitated for 5 minutes, the solid was recovered by filtration and dried for half an hour at 105° C. The product was pulverized and screened. When added to cold water with gentle agitation, it dispersed rapidly and, on standing, formed a clear solution. Untreated hydroxyethylcellulose of the same type lumped in cold water, taking a long time to go into solution.

The amount of glyoxal used in the treatment of hydroxyethylcellulose was 4.1 weight percent based on the weight of hydroxyethylcellulose.

The importance of this invention lies in the greater ease with which solutions and dispersions of cellulose derivatives can be prepared when they have been modified in the manner described. With the modified products, dispersion and dissolution can be accomplished without agitation, at lower temperatures, in much less time, and with less likelihood of degrading the product than has been possible heretofore. Transparent gels can be prepared with a much higher cellulose content than can be attained with unmodified products.

The products which are the result of this invention can have much wider application and will be more widely accepted than heretofore. For example, sodium carboxymethylcellulose has been proposed as a laundry size for use on textiles, but as yet it has not been widely used for this purpose because of the difficulties in obtaining uniform dispersions or solutions. Sodium carboxymethylcellulose when modified with glyoxal avoids these difficulties and makes a very satisfactory laundry size.

This application is a continuation-in-part of our pending application Serial No. 475,581, filed December 15, 1954.

What we claim is:

1. A method for rendering water-soluble sodium carboxymethyl-cellulose more readily dispersible and soluble in water which comprises treating the sodium carboxymethylcellulose in particulate form, substantially in the absence of free alkali, with glyoxal in an amount sufficient for the sodium carboxymethylcellulose to combine with from 0.001 to 0.2 mol of glyoxal per base-mol of the sodium carboxymethylcellulose, and drying the sodium carboxymethylcellulose so treated at a temperature and for a length of time less than those at which a colored product is produced.

2. A method as claimed in claim 1 wherein the sodium carboxymethylcellulose is suspended in a solution of glyoxal in alcohol, the suspension is agitated and its solid content together with the solution absorbed therein is separated from the dispersion.

3. A method as claimed in claim 1 wherein the sodium carboxymethylcellulose is subjected to the action of glyoxal vapor.

4. A method as claimed in claim 1 wherein the sodium carboxymethylcellulose is subjected to a mixing action and a solution of glyoxal is sprayed on to the sodium carboxymethylcellulose during mixing.

5. Modified water-soluble sodium carboxymethylcellulose comprising substantially neutral water-soluble sodium carboxymethylcellulose in particulate form combined with from 0.001 to 0.2 mol of glyoxal per base-mol of the sodium carboxymethylcellulose, said modified sodium carboxymethylcellulose being rapidly dispersible and soluble in water.

6. A method for rendering a solid, water-soluble cellulose ether selected from the group consisting of alkyl ethers of cellulose, hydroxyalkyl ethers of cellulose and carboxyalkyl ethers of cellulose more dispersible and soluble in water, which comprises, treating and reacting said solid cellulose ether in particulate form with glyoxal in an amount from about 0.005% to about 5% based on the weight of said cellulose ether.

7. A method according to claim 6 wherein the cellulose ether is an alkyl ether of cellulose.

8. A method according to claim 6 wherein said cellulose ether is a hydroxyalkyl ether of cellulose.

9. A method according to claim 6 wherein said cellulose ether is a carboxyalkyl ether of cellulose.

10. A method according to claim 6 wherein the amount of glyoxal is from about 0.001 to 0.2 mol of glyoxal per base-mol of said water-soluble cellulose ether.

11. A method according to claim 10 wherein the water-soluble cellulose ether is a hydroxyalkyl ether of cellulose.

References Cited in the file of this patent
UNITED STATES PATENTS
2,879,268   Jullander _____ Mar. 24, 1959